(12) United States Patent
Peterman et al.

(10) Patent No.: US 12,132,689 B2
(45) Date of Patent: Oct. 29, 2024

(54) AUTOMATED ELECTRONIC MESSAGING SYSTEM TESTING USING REDUCED MEMORY RESOURCES

(71) Applicant: Truist Bank, Charlotte, NC (US)

(72) Inventors: Luana Peterman, Lancaster, SC (US); Kendra Henry, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/063,721

(22) Filed: Dec. 9, 2022

(65) Prior Publication Data

US 2024/0195760 A1    Jun. 13, 2024

(51) Int. Cl.

| | |
|---|---|
| G06F 16/18 | (2019.01) |
| G06F 11/36 | (2006.01) |
| G06F 16/182 | (2019.01) |
| H04L 43/50 | (2022.01) |
| H04L 51/04 | (2022.01) |
| H04L 51/066 | (2022.01) |
| H04L 51/08 | (2022.01) |
| H04L 51/224 | (2022.01) |

(52) U.S. Cl.
CPC .............. H04L 51/04 (2013.01); H04L 43/50 (2013.01); H04L 51/066 (2013.01); H04L 51/08 (2013.01); H04L 51/224 (2022.05)

(58) Field of Classification Search
CPC ....... H04L 51/04; H04L 51/066; H04L 51/08; H04L 51/224; G06Q 20/389
See application file for complete search history.

(56) References Cited

U.S. PATENT DOCUMENTS

| | | | |
|---|---|---|---|
| 6,092,114 A * | 7/2000 | Shaffer ................. | H04L 51/066 707/999.001 |
| 6,658,483 B1 * | 12/2003 | Iwamoto ............... | H04L 67/565 709/246 |
| 6,799,147 B1 * | 9/2004 | Balasubramanian ........................ | G06F 11/3495 702/186 |
| 6,915,265 B1 * | 7/2005 | Johnson ................. | G16H 10/65 705/2 |
| 7,065,566 B2 * | 6/2006 | Menard ................... | H04L 63/02 709/224 |

(Continued)

*Primary Examiner* — Thu V Nguyen
*Assistant Examiner* — Golam Mahmud
(74) *Attorney, Agent, or Firm* — Kilpatrick Townsend & Stockton LLP; Michael A. Springs, Esq.

(57) ABSTRACT

An electronic messaging system testing tool that can, using reduced memory and processor resources, communicate with an electronic messaging system over a network, receive from a database, a file including information in a non-standardized format, about multiple electronic transactions, convert the non-standardized electronic transaction information into a standardized format, and create a bulk message file containing a multitude of standardized multi-variable electronic messages, where each electronic message corresponds to an electronic transaction represented in the file received from the database. The electronic messaging system testing tool can also transmit the bulk message file to the electronic messaging system, and initiate an attempted processing of the electronic messages in the bulk message file by the electronic messaging system, to test the functionality of the electronic messaging system.

20 Claims, 3 Drawing Sheets

(56) References Cited

U.S. PATENT DOCUMENTS

| | | | | |
|---|---|---|---|---|
| 7,167,924 | B1* | 1/2007 | Symonds | G06Q 20/1085 |
| | | | | 709/206 |
| 7,385,927 | B2* | 6/2008 | Gygi | G06F 11/2733 |
| | | | | 370/242 |
| 10,225,217 | B2* | 3/2019 | Gillespie | H04L 51/046 |
| 10,810,110 | B1* | 10/2020 | Thomas | G06F 11/3664 |
| 10,922,419 | B2* | 2/2021 | Sloan | G06F 21/577 |
| 11,244,407 | B2* | 2/2022 | Whitley | G06Q 40/12 |
| 11,704,671 | B2* | 7/2023 | Ireland | G06Q 20/4014 |
| | | | | 705/44 |
| 11,854,016 | B1* | 12/2023 | Pillarisetty | G06F 11/3688 |
| 2005/0177716 | A1* | 8/2005 | Ginter | G06T 1/0021 |
| | | | | 713/157 |
| 2006/0167771 | A1* | 7/2006 | Meldahl | G06Q 40/06 |
| | | | | 705/30 |
| 2006/0168006 | A1* | 7/2006 | Shannon | H04L 51/212 |
| | | | | 709/206 |
| 2008/0086365 | A1* | 4/2008 | Zollino | G06Q 30/02 |
| | | | | 705/7.31 |
| 2008/0270253 | A1* | 10/2008 | Huang | G06Q 20/04 |
| | | | | 705/26.81 |
| 2009/0216676 | A1* | 8/2009 | Mathur | G06Q 40/00 |
| | | | | 705/35 |
| 2012/0323749 | A1* | 12/2012 | Lapidus | G06Q 40/123 |
| | | | | 705/31 |
| 2013/0304554 | A1* | 11/2013 | Gaur | G06Q 30/0215 |
| | | | | 705/26.1 |
| 2015/0379516 | A1* | 12/2015 | Yingst | G06Q 20/40 |
| | | | | 705/44 |
| 2021/0182247 | A1* | 6/2021 | Fuksbrumer | G06F 11/3664 |
| 2021/0397965 | A1* | 12/2021 | Zhang | G06N 3/082 |
| 2022/0206932 | A1* | 6/2022 | Samal | G06F 11/3664 |

* cited by examiner

AUTOMATED ELECTRONIC MESSAGING SYSTEM TESTING USING REDUCED MEMORY RESOURCES

TECHNICAL FIELD

The present disclosure relates generally to the testing of an electronic messaging system, and more particularly, although not exclusively, to automatically testing an electronic messaging system using reduced memory and processor resources.

BACKGROUND

Across many different settings, electronic tasks, such as for example electronic messaging operations, are frequently performed in accordance with particular standards. These standards can change, in which case an existing system operating according to a previous standard must be replaced so that future operations will be in conformance with the new standard. Oftentimes, the new standard must be adopted by some pronounced deadline.

Developing new systems, such as new electronic messaging systems, to comply with a changed standard can require not just considerable upfront design and development work, but also a substantial amount of testing to verify correct operation prior to a new system being placed into service. Proper testing of a new system can require a significant amount of computerized memory resources and processor power, particularly when a large amount of test information is needed.

The amount of memory and processor resources required to test a new system may be even greater when information in a standardized format needed to test a new system is not available at the time of testing because, for example, the standardized format has not been previously used, and new standardized information will not be generated through normal channels until new systems are already in operation. In such a case, test information in a standardized format will need to be generated. Such a process can consume considerable memory and processor resources. In the case of testing a new electronic messaging system, for example, the process of repeatedly generating, saving, and providing individual test messages in the standardized format may be a substantial drain on memory and processor resources, especially when a large volume of test messages is needed.

SUMMARY

According to one example of the present disclosure, an electronic messaging system testing tool may comprise a processor communicatively coupled to a database, and memory that is communicatively coupled to the processor and includes instructions that are executable by the processor to cause the processor to perform operations. The operations may include communicating with the electronic messaging system over a network, and receiving from the database, a file including information in a non-standardized format, about multiple electronic transactions. The operations may also include converting the non-standardized electronic transaction information into a standardized format, and creating a bulk message file containing a multitude of standardized multi-variable electronic messages, where each standardized multi-variable electronic message corresponds to an electronic transaction represented in the file received from the database. The operations may further include transmitting the bulk message file to the electronic messaging system, and initiating an attempted processing, by the electronic messaging system, of the standardized multi-variable electronic messages in the bulk message file.

According to another example of the present disclosure, a non-transitory computer readable medium may contain instructions that are executable by a processor to cause the processor to perform operations. The operations may include communicating with an electronic messaging system and a database over a network, and receiving from the database, a file including information in a non-standardized format, about multiple electronic transactions. The operations may also include converting the non-standardized electronic transaction information into a standardized format, and creating a bulk message file containing a multitude of standardized multi-variable electronic messages, where each standardized multi-variable electronic message corresponds to an electronic transaction represented in the file received from the database. The operations may further include transmitting the bulk message file to the electronic messaging system, and initiating an attempted processing, by the electronic messaging system, of the standardized multi-variable electronic messages in the bulk message file.

According to a further example of the present disclosure, a method of testing an electronic messaging system may comprise storing in a database, a file including information in a non-standardized format, about multiple electronic transactions, receiving, at a testing tool from the database, the file of non-standardized electronic transaction information, and converting, by the testing tool, the non-standardized electronic transaction information into a standardized format. The method may also comprise creating, by the testing tool, a bulk message file containing a multitude of standardized multi-variable electronic messages, where each standardized multi-variable electronic message corresponds to an electronic transaction represented in the file received from the database. The method may further comprise transmitting, by the testing tool to electronic messaging system, the bulk message file, and initiating, by the testing tool, an attempted processing by the electronic messaging system, of the standardized multi-variable electronic messages in the bulk message file. The method may additionally include evaluating results of the attempted processing of the standardized multi-variable electronic messages in the bulk message file by the electronic messaging system, to identify processing errors or failures.

DETAILED DESCRIPTION

Figure 1:
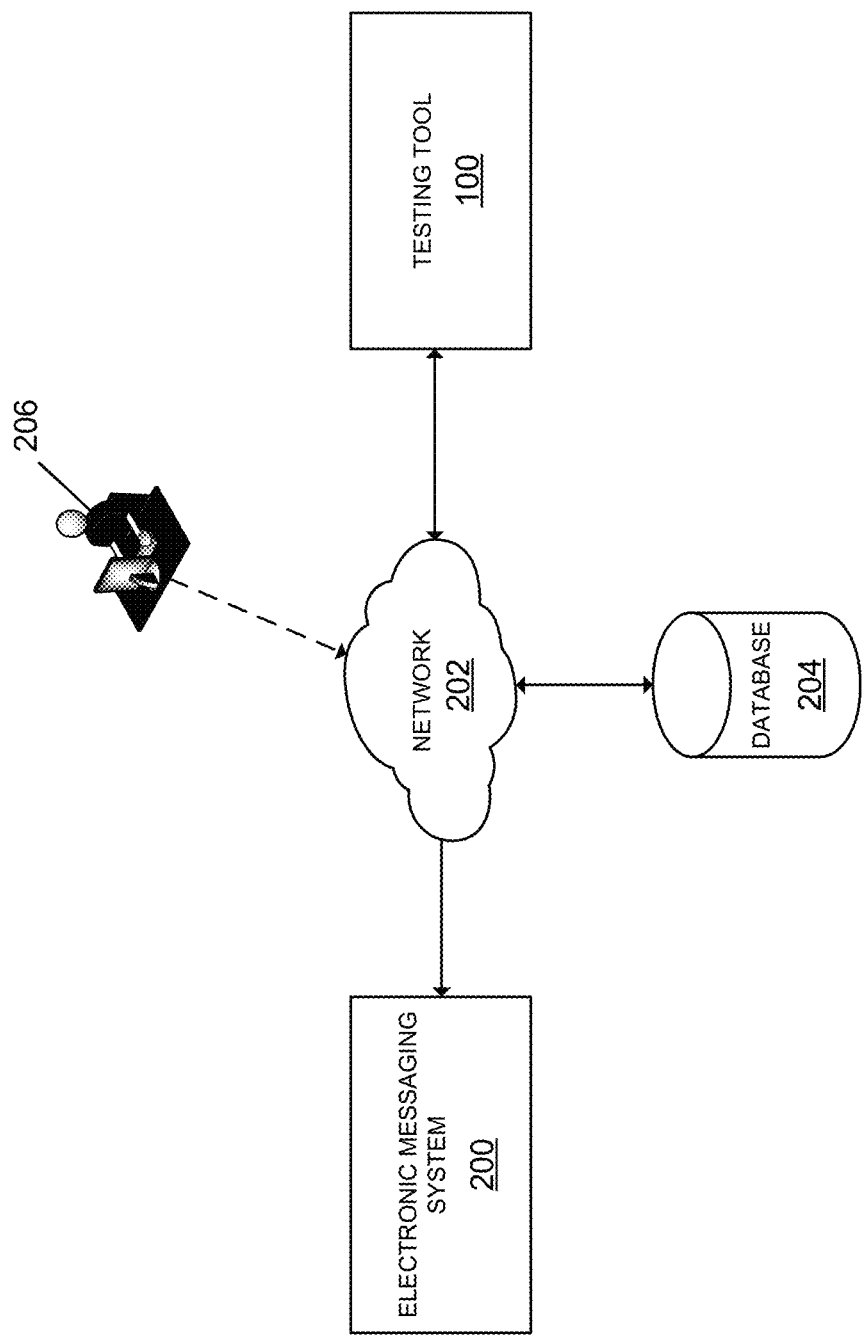
FIG. 1 is a schematic block diagram of an electronic messaging system testing tool in communication with an electronic messaging system and a database, according to an example of the present disclosure.

Certain aspects and examples of the present disclosure generally relate to a computerized testing tool for automatically testing the functionality of an electronic messaging system using minimized memory and processor resources. The electronic messaging system may be, but is not required to be, a system under development. The electronic messaging system may be configured to process electronic messages of a newly specified standardized format that complies with a given governing standard.

When developing such a new electronic messaging system, it may be the case that information in the standardized format for which the electronic messaging system is configured, may be non-existent because the standardized format has not been previously used, and because the system development process by affected entities typically occurs far ahead of the date on which new systems will be put into service. Consequently, with no properly formatted information already available to test a newly developed electronic messaging system, a multitude of properly formatted test messages will need to be created.

In some cases, an electronic message that complies with a particular standardized format may be comprised of numerous pieces of information that must be arranged in a particular order. For example, and without limitation, electronic messages formatted according to the International Organization for Standardization (ISO) 20022 standard may include a particular ordering of more than 100 data fields, which can result in a single message being two to three pages in length. Generating and individually transmitting a large number of such complex and lengthy electronic messages can consume significant memory and processor resources.

The use of a computerized electronic messaging system testing tool according to examples of the present disclosure, which can accept and convert existing non-standardized electronic transaction information into test messages of a standardized format, can result in a significant reduction in the memory and processor resources that would otherwise be required to create such test messages. For example, rather than repeatedly creating, saving, and providing individual test messages, a computerized electronic messaging system testing tool according to examples of the present disclosure can create and transmit to an electronic messaging system being tested, a single bulk message file containing a multitude of standardized electronic test messages.

The use of a computerized testing tool according to examples of the present disclosure can also result in an electronic messaging system testing process being conducted more efficiently and thoroughly, as the computerized testing tool can quickly and repeatedly generate numerous unique test messages than can be provided to an electronic messaging system in bulk as needed during testing. A computerized testing tool according to an example of the present disclosure can also provide for automatic electronic messaging system testing, by controlling the non-standardized information receiving and format conversion process at the testing tool, the transmission of converted standardized information in bulk from the testing tool to an electronic messaging system to be tested, and the initiation of a testing process at the electronic messaging system.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

FIG. 1 is a schematic block diagram of an electronic messaging system testing tool 100 (which may also be referred to herein as "testing tool") in communication with an electronic messaging system 200 according to one example of the present disclosure. In the example depicted in FIG. 1, the electronic messaging system 200 is an electronic messaging system configured to receive and process electronic transaction-related electronic messages in a format that comports with a particular standard. While an electronic messaging system configured to process electronic messages of a particular format is described in detail below for purposes of illustrating examples of the inventive testing tool, testing tools according to the present disclosure may also be used with electronic messaging systems implementing other standardized message formats.

As shown in FIG. 1, the testing tool 100 is in communication with the electronic messaging system 200 over a network 202. The network 202 may be, without limitation, a local area network (LAN), a wide-area network (WAN) such as the Internet, an institutional network, cellular or other wireless networks, virtual networks such as an intranet or an extranet, etc. The nature of the network(s) employed with a given testing tool example may depend on the location of the testing tool relative to an electronic messaging system of interest.

The testing tool 100 is also shown to be in communication with a database 204 over the network 202. In this example, the database 204 may be used to store existing information about multiple electronic transactions. For example, the electronic transaction information stored in the database 204 may have been previously received in association with past electronic transactions. In any case, as described in more detail below, the electronic transaction information stored in the database 204 is of a non-standardized format that, while readily available, cannot be processed by the electronic messaging system 200.

Electronic transaction information of various file types may be stored in the database 204. As one example, existing or simulated electronic transaction information may be entered into a spreadsheet, and the spreadsheet may be stored on the server prior to subsequent transmission to the testing tool 100 for conversion of the information contained therein. According to an example of the present disclosure, a spreadsheet of electronic transaction information may be created by a user 206 and stored in the database 204 via the network 202. A spreadsheet of electronic transaction information may be stored as a file of conventional .csv format, or another format.

According to an aspect of the present disclosure, when a spreadsheet of electronic transaction information is created for use by the testing tool 100, the electronic transaction information may be arranged in the spreadsheet in different ways. For example, separate electronic transactions may be recorded in separate rows. Each electronic transaction may also be identified, for example, with a unique transaction identifier. Multiple variables associated with each electronic transaction may be further arranged in columns. In any event, a spreadsheet can be an efficient mechanism for supplying electronic transaction information for the testing of the electronic messaging system 200, as information associated with multiple transactions can be easily and quickly entered using various functions of the spreadsheet software. Further, the information entered into the spreadsheet need not be arranged in a complex order that might be required by the standardized format.

According to another aspect of the present disclosure, the testing tool 100 is configured to receive from the database 204, a file including information provided in a non-standardized format about multiple electronic transactions, and to convert the non-standardized electronic transaction information into a standardized format that can be processed by the electronic messaging system 200. Examples of the testing tool 100 may be configured to convert information in one non-standardized format into information in one standardized format, or to convert information in one or more non-standardized formats into information in one or more standardized formats.

For purposes of illustration, one example of the testing tool 100 may convert non-standardized electronic transaction information contained in a .csv format file into a bulk message file containing a multitude of individual electronic transaction messages in the standardized format for which the electronic messaging system 200 is configured. In this particular example, the bulk message file may contain electronic messages in a standardized ISO 20022 format.

ISO 20022 is a relatively new standard that describes and implements, among other things, a universal messaging standard (i.e., standardized messaging format) to be used relative to various types of electronic transactions. The ISO 20022 standard is designed to primarily utilize extensible markup language (XML) and Abstract Syntax Notation One (ASN.1) syntaxes for messaging, but allows for the use of additional syntaxes if requirements change or new requirements develop. Consequently, examples of the testing tool 100 may create bulk message files containing XML or ASN.1 formatted messages. The creation by a testing tool of messages in alternative standardized formats is also possible in other examples.

An electronic message in compliance with ISO 20022 can include more than 100 data fields (variables), which are selected and presented based on the nature of the associated transaction, and must be arranged in a particular order within the body of the message. As such, the bulk message file created by the testing tool 100 via the information conversion process, may include numerous multi-variable electronic messages, each of which corresponds to an electronic transaction represented in the file of non-standardized electronic transaction information received by the testing tool 100 from the database 204.

Once a bulk message file has been created by the testing tool 100, the testing tool may transmit the bulk message file to the electronic messaging system 200. Creating and transmitting a single bulk message file consumes significantly less memory and processor resources than does repeatedly creating and transmitting individual test messages, thereby freeing up processor and memory resources for other tasks or allowing the testing tool 100 to be less expensively constructed.

Once the bulk message file has been transmitted and received, the testing tool 100 may initiate attempted processing of the standardized multi-variable electronic messages in the bulk message file by the electronic messaging system 200. The attempted processing of the standardized multi-variable electronic messages in the bulk message file can be used to test the overall functionality of the electronic messaging system 200, as well as functionality specific to messages associated with particular types of transactions. For example, the attempted processing of the standardized electronic messages in the bulk message file can be used to test the ability of the electronic messaging system 200 to process electronic messages associated with real time payment transactions, wire transactions, or Swift transactions.

The results of the electronic messaging system 200 attempted processing operation may be evaluated for errors, failures, or other problems. According to some aspects of the present disclosure, the testing tool 100 may receive information about electronic messaging system 200 testing errors, failures, or other problems, and may generate notifications or take other actions in response thereto. Additional bulk message files containing multiple standardized electronic messages may be created by the testing tool 100 and transmitted to the electronic messaging system 200 as needed for further testing.

Figure 2:
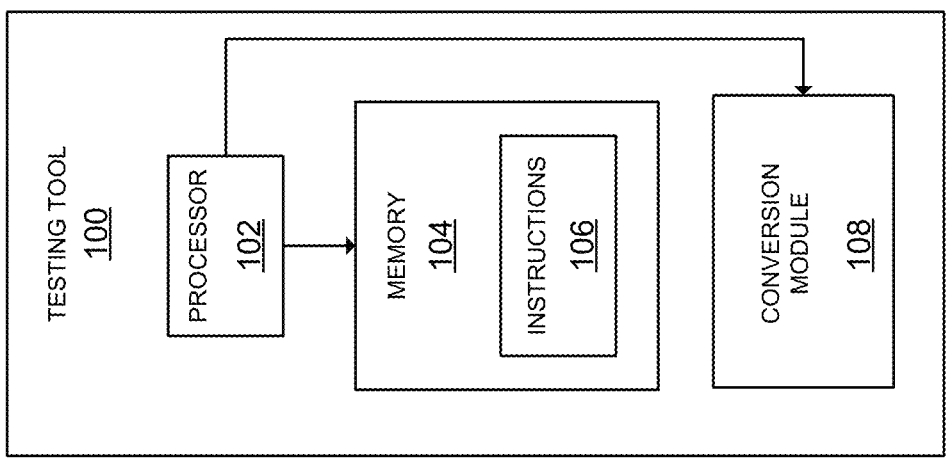
FIG. 2 is a block diagram showing components of an electronic messaging system testing tool according to one example of the present disclosure.

FIG. 2 is a block diagram depicting various components of one example of a testing tool according to the present disclosure, such as the testing tool 100 described above with respect to the schematic diagram of FIG. 1. As depicted, the testing tool 100 may include a processor 102 that is communicatively coupled to a memory 104. The processor 102 may also be communicatively coupled to the database 204 as generally represented in FIG. 1. The database 204 may be located remotely from the processor 102 and in communication with the processor over a network, as indicated in FIG. 1.

The processor 102 can include one processing device or multiple processing devices. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform operations. In some examples, the instructions 106 can include processor-specific instructions generated by a compiler or an interpreter from code written in a suitable computer-programming language, such as C, C++, C #, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can be a non-transitory, computer-readable medium from which the processor 102 can read the instructions 106. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 102 can read the instructions 106.

As shown, the testing tool 100 may also include an information conversion module 108. According to an aspect of the present disclosure, the information conversion module 108 may convert non-standardized electronic transaction information in a file received from the database 204 into standardized electronic transaction information for which the electronic messaging system 200 is configured. Examples of the information conversion module 108 according to the present disclosure may include one or more submodules and applications for performing electronic transaction information conversion operations. The information conversion module 108 may also include its own processor or memory.

Figure 3:
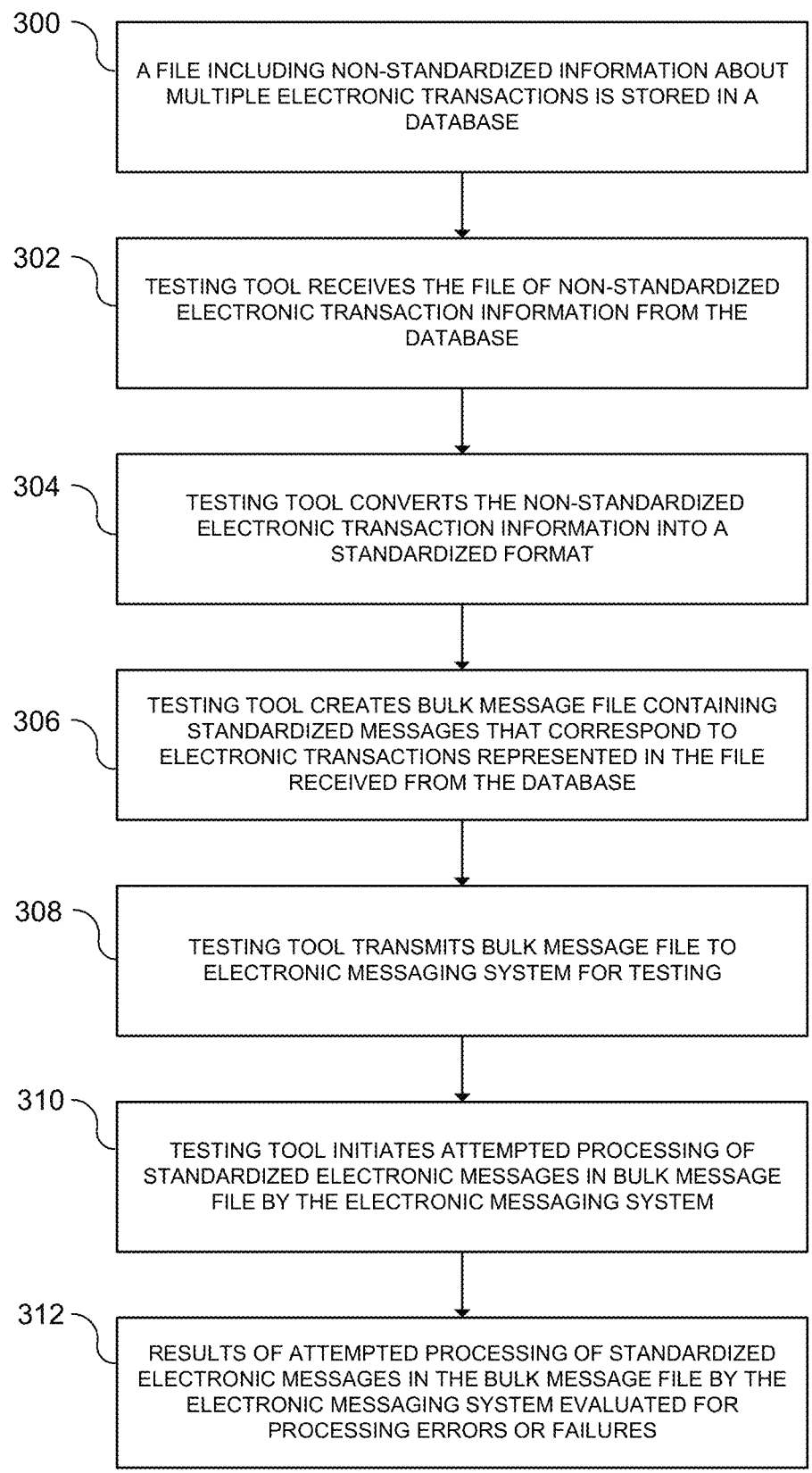
FIG. 3 is a flowchart of a method of testing an electronic messaging system for functionality using information of a converted format, according to one example of the present disclosure.

FIG. 3 is a flowchart illustrating a method of testing an electronic messaging system according to some aspects of the present disclosure. The example method represented in FIG. 3 begins at block 300 with storing in a database, a file including information in a non-standardized format, about multiple electronic transactions. At block 302, the file of non-standardized electronic transaction information from the database may be received at a testing tool. At block 304, the testing tool may convert the non-standardized electronic transaction information into a standardized format. At block 306, the testing tool may then create a bulk message file containing a multitude of standardized multi-variable electronic messages, where each standardized multi-variable electronic message corresponds to an electronic transaction represented in the file received from the database.

As indicated at block 308, once the testing tool has created the bulk message file, the testing tool may transmit the bulk message file to the electronic messaging system. At block 310, the testing tool may then initiate an attempted processing of the standardized multi-variable electronic messages in the bulk message file by the electronic messaging system. The results of the attempted processing of the standardized multi-variable electronic messages in the bulk message file by the electronic messaging system may subsequently be evaluated at block 312 to identify processing errors or failures.

Detected errors or failures during attempted processing of the multi-variable electronic messages by the electronic messaging system may be corrected by appropriate personnel. According to an aspect of the present disclosure, some examples of the testing tool 100 may receive information about electronic messaging system 200 testing errors, failures, or other problems, and may generate and transmit notifications to appropriate personnel, or take other actions in response thereto. When testing errors, failures, or other problems are detected, the electronic messaging system 200 may also be caused, by the testing tool 100, to re-attempt processing of the standardized multi-variable electronic messages in the previously supplied bulk message file, or a new bulk message file of standardized multi-variable electronic messages may be created by the testing tool and transmitted to the electronic messaging system for further testing.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A testing tool, comprising:
    a processor communicatively coupled to a database;
    memory communicatively coupled to the processor, the memory including instructions that are executable by the processor to cause the processor to:
        communicate, over a network, with an electronic messaging system that is separate from the testing tool;
        receive from the database, a file including information about multiple electronic transactions, the information being in a non-standardized format relative to the electronic messaging system and not processable by the electronic messaging system;
        convert, at the testing tool, the non-standardized format electronic transaction information into standardized format electronic transaction information that is processable by the electronic messaging system;
        create, at the testing tool, from the standardized format electronic transaction information, a bulk message file containing a multitude of standardized multi-variable electronic messages, where each standardized multi-variable electronic message corresponds to an electronic transaction represented in the file received from the database;
        transmit the bulk message file to the electronic messaging system; and
        cause the electronic messaging system to initiate and attempted processing of the standardized multi-variable electronic messages in the bulk message file.

2. The testing tool of claim 1, wherein the memory includes instructions that are executable by the processor for causing the processor to arrange each variable of each standardized multi-variable electronic message in a particular order that is dictated by the standardized format.

3. The testing tool of claim 1, wherein the memory includes instructions that are executable by the processor for causing the processor to convert the non-standardized electronic transaction information into a standardized format that complies with ISO 20022.

4. The testing tool of claim 3, wherein the standardized format is extensible markup language (XML) format.

5. The testing tool of claim 3, wherein the standardized format is Abstract Syntax Notation One (ASN.1) format.

6. The testing tool of claim 1, wherein the database file is a .csv formatted file.

7. A non-transitory computer-readable medium comprising instructions that are executable by a processor of a testing tool for causing the processor to:
    communicate with an electronic messaging system and a database over a network, at least the electronic messaging system separate from the testing tool;
    receive, from the database, a file including information about multiple electronic transactions, the information being in a non-standardized format relative to the electronic messaging system and not processable by the electronic messaging system;
    convert, at the testing tool, the non-standardized electronic transaction information into standardized format electronic transaction information that is processable by the electronic messaging system;
    create, at the testing tool, from the standardized format electronic transaction information, a bulk message file containing a multitude of standardized multi-variable electronic messages, where each standardized multi-variable electronic message corresponds to an electronic transaction represented in the file received from the database;
    transmit the bulk message file to the electronic messaging system; and
    cause the electronic messaging system to initiate and attempted processing of the standardized multi-variable electronic messages in the bulk message file.

8. The non-transitory computer-readable medium of claim 7, wherein the instructions of the non-transitory computer-readable medium are executable for causing the processor to arrange each variable of each standardized multi-variable electronic message in a particular order that is dictated by the standardized format.

9. The non-transitory computer-readable medium of claim 7, wherein the instructions of the non-transitory computer-readable medium are executable for causing the processor to convert the non-standardized electronic transaction information into a standardized format that complies with ISO 20022.

10. The non-transitory computer-readable medium of claim 9, wherein the standardized format is extensible markup language (XML) format.

11. The non-transitory computer-readable medium of claim 9, wherein the standardized format is Abstract Syntax Notation One (ASN.1) format.

12. The non-transitory computer-readable medium of claim 7, wherein the database file is a .csv formatted file.

13. A method of testing an electronic messaging system, comprising:
- storing in a database, a file including information about multiple electronic transactions, the information being in a non-standardized format relative to the electronic messaging system and not processable by the electronic messaging system;
- receiving, from the database, at a testing tool that is separate from the electronic messaging system, the file of non-standardized electronic transaction information;
- converting, by the testing tool, the non-standardized electronic transaction information into standardized format electronic transaction information that is processable by the electronic messaging system;
- creating, by the testing tool, from the standardized format electronic transaction information, a bulk message file containing a multitude of standardized multi-variable electronic messages, where each standardized multi-variable electronic message corresponds to an electronic transaction represented in the file received from the database;
- transmitting, by the testing tool to the electronic messaging system, the bulk message file;
- causing, by the testing tool, the electronic messaging system to attempt processing of the standardized multi-variable electronic messages in the bulk message file; and
- evaluating results of the attempted processing, by the electronic messaging system, of the standardized multi-variable electronic messages in the bulk message file, to identify processing errors or failures.

14. The method of claim 13, wherein each variable of each standardized multi-variable electronic message is arranged in a particular order that is dictated by the standardized format.

15. The method of claim 13, wherein the non-standardized electronic transaction information is converted into a standardized format that complies with ISO 20022.

16. The method of claim 15, wherein the standardized format is extensible markup language (XML) format.

17. The method of claim 15, wherein the standardized format is Abstract Syntax Notation One (ASN.1) format.

18. The method of claim 13, wherein the database file is a spreadsheet file of .csv format.

19. The method of claim 18, wherein the database file is created by entering non-standardized electronic transaction information about prior electronic transactions into a spreadsheet.

20. The method of claim 19, wherein the non-standardized electronic transaction information is entered into the spreadsheet in an arrangement other than the arrangement dictated by the standardized format.

* * * * *